Nov. 22, 1955  T. H. OSTER  2,724,801
METHOD OF AND APPARATUS FOR TESTING ELECTRIC MACHINES
Filed Sept. 22, 1951
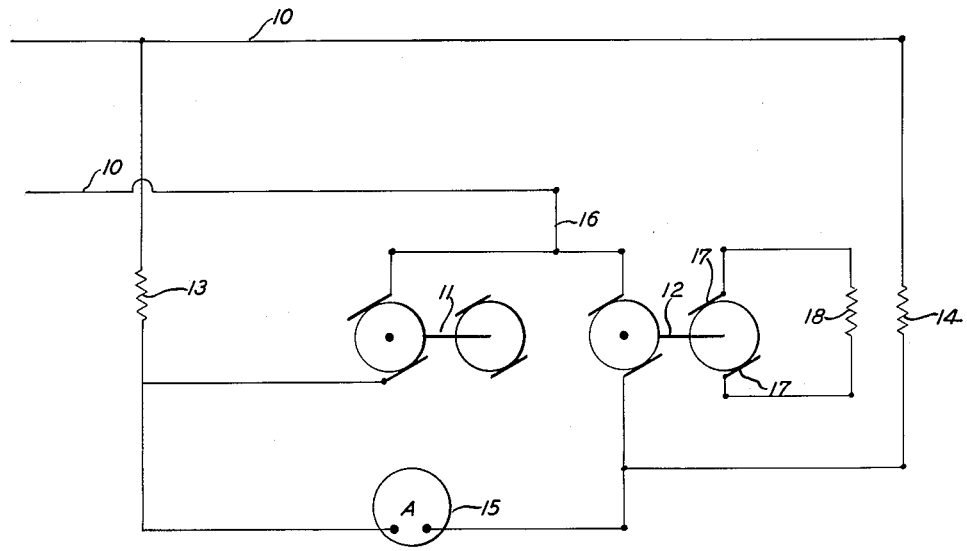
THOMAS H. OSTER
INVENTOR.
BY E.C. McRae
J. R. Faulkner
ATTORNEYS

2,724,801

METHOD OF AND APPARATUS FOR TESTING ELECTRIC MACHINES

Thomas H. Oster, Dearborn, Mich., assignor to Ford Motor Company, Dearborn, Mich., a corporation of Delaware Application September 22, 1951, Serial No. 247,868

7 Claims. (Cl. 324—158)

This invention is concerned with the testing of electrical machinery and more particularly with a process and apparatus for rapidly, economically and completely testing the electrical and mechanical characteristics of electric motors and generators. The process and apparatus which constitute the subject matter of this invention is particularly adaptable to the routine testing of small electrical motors and generators at the end of the assembly operations where many similar units are being assembled. The production of small electrical motors and generators is intensely competitive and the labor required for the testing of the complete units has heretofore amounted to an appreciable portion of the cost of the finished machine. Of necessity, the final testing procedure has been at best incomplete and has resulted in the acceptance of many machines carrying defects certain to be productive of trouble in service.

The primary objective of this invention is to provide a method and apparatus useful for rapidly testing motors and generators and to more completely examine the electrical and mechanical characteristics of such machinery. It is a further object of this invention to remove as completely as possible the "human element" from such testing procedure and hence obtain more reliable results.

Fundamentally this invention relies upon the fact that if two electrical machines substantially identical in electrical and mechanical construction are simultaneously connected to the same or equivalent sources of electrical energy, they will reach their maximum speed at substantially the same instant, and at every instant during the acceleration period the speed and current in each motor will be substantially the same. Any serious variation between the two machines, either of an electrical or mechanical nature is certain to be reflected either in the current-time or speed-time relationship during the acceleration period.

The practical application of this invention is probably best understood from a study of the drawing which is an electrical diagram for the testing of small compound shunt motors.

The machines selected to illustrate this invention are two Westinghouse Type FK inverters normally employed to convert the twenty-eight volt direct current employed in aircraft into one hundred cycle alternating current, single phase, for radio use. These machines are rated on the direct current side at twenty-eight volts and two and six-tenths amperes. The alternating current output is rated at nineteen volts and two and four-tenths amperes. The rated speed is six thousand three hundred revolutions per minute. These machines are typical single phase, compound wound inverters employing a single field for both the alternating current and direct current ends of the machine. The alternating current output is withdrawn through a pair of slip rings mounted on the rotor opposite the usual direct current commutator. One factor that led to the selection of these particular machines for illustration of this invention was the ease with which a load could be applied to the alternating current side of the machines to simulate a defect in the armature windings of the conventional direct current machine.

In the drawing, the source of direct current has been designated 10, and is connected to standard machine 11 and machine to be tested 12 through resistances 13 and 14 respectively. It is to be understood that resistances 13 and 14 have the same electrical characteristics and are sufficiently high in value to produce a substantial voltage drop when the machines are operating at normal voltage and full speed. In the tests described each of these resistances consisted of eighty-eight and one-quarter inches of soft copper wire of nominally twenty-two gauge. The ohmic value of each of these resistances was found to be 0.15. An ammeter 15 registering one ampere at full scale deflection was connected across the motor ends of resistances 13 and 14. The leads of the motors 11 and 12 not connected to resistances 13 and 14 are connected directly to source 10 through lead 16. This is of course a Wheatstone bridge circuit in which any unequal current through resistances 13 and 14 will be reflected in a correspondingly unequal voltage drop across these resistors and cause a deflection of ammeter 15.

To prolong the acceleration period sufficiently to enable accurate observation, supply 10 was first adjusted so that the voltage actually applied to the terminals of the motors was 10. When the motors were simultaneously energized, ammeter 15 indicated that during the acceleration period current flowed both ways through this instrument, indicating minor electrical and/or mechanical variations between these specific motors. When full speed had been reached the imbalance of these machines as indicated by ammeter 15 was 0.14 ampere. During the acceleration period, the maximum imbalance indicated in the same electrical direction was 0.24 ampere and in the opposite direction 0.14 ampere. To simulate in actual practise any of the sundry mechanical defects such as improper tightening or misalignment of the endbells which impede free rotation of the armature, a light finger pressure was applied to one of the slip rings of machine 12 and standard machine 11 allowed to accelerate freely. This slight retarding action registered an imbalance of 0.66 ampere during acceleration or an increase of 0.42 ampere over the unretarded acceleration. To simulate a partial short circuit in the armature under test, the alternating current leads 17 of machine to be tested 12 were loaded with resistance 18. This resistance consisted of sixteen inches of resistance wire having a diameter of 0.013 inch. By measurement this resistance exhibited an ohmic value of 2.20. When the machine so loaded was accelerated together with the unloaded standard machine, a maximum imbalance of 0.67 ampere was indicated. This is 0.45 ampere more than the unloaded value.

The voltage applied to the motors was raised to 22, the highest value at which it was practical to visually evaluate events during the acceleration period. At this voltage and with both machines free to rotate, the maximum imbalance at full speed was 0.08 ampere. During this test the ammeter 15 also indicated current flowing both ways and varied from 0.70 ampere in the direction of the final imbalance to 0.66 ampere in the opposite direction. When the machine to be tested was retarded by a light finger pressure on one slip ring, ammeter 15 was insufficient to record the imbalance current. Similarly when machine 12 was loaded with 2.2 ohm resistance 18, the imbalance current was too great to be recorded on meter 15.

This invention has been described particularly in connection with a particular type of direct current, compound shunt motor. However, it is by no means so limited and can be applied with equal facility to ordinary shunt wound motors, series motors, universal motors, or with suitable indicating apparatus to alternating current motors. This invention is predicated upon the use of the inertia of the motor as a constantly varying load, and the fact that a motor will upon any given applied voltage accelerate from standstill to full speed in a predictable and repeatable manner. Similarly the current drawn by the machine will decay from the initial inrush value limited only by the ohmic resistance or impedance of the machine to full speed current in a predictable and repeatable manner. The progress of a machine accelerating against its own inertia from standstill to full load has been described as compared with the similar cycle of an identical machine, using an ammeter to give a visual indication of the differential voltage drop across similar resistances. It is apparent that a variety of indicating means may be substituted for ammeter 15. For example a relay set to the desired tolerance may be substituted and caused to actuate an indicating device which will simply indicate an acceptable or a reject machine. If it be desired to integrate the imbalance current flowing throughout the entire acceleration cycle without regard to direction, a thermal fuse of proper value may be substituted for relay 15 and will melt when the predetermined, integrated imbalance current value is exceeded. The difference of potential existing across the terminals of the standard and test motor may also be employed to fire a suitable electronic circuit to give an indication only of an acceptable or reject machine.

It is to be understood that the designation of machine 11 as the standard machine and machine 12 as the machine to be tested is purely arbitrary. In actual usage, machine 11 would be a carefully chosen and tested production machine which would be retained purely as a standard while the machines to be tested would be substituted for machine 12.

In the preceding description, the machinery has been shown as accelerating only against its own inertia. It is apparent that if desired, an artificial inertia in the form of a temporary flywheel may be added to the machine to be tested, and will serve to prolong the acceleration period for any given voltage. Similarly, a load of any desired characteristics may be imposed upon the motor, as for instance a fan may be so driven. Such an external load will permit the use of higher testing voltages on universal or series motors without their attaining dangerous speeds. Also, if desired, both an inertia load and fan or other external load may be used simultaneously if the effects of both are desired.

Under some circumstances it may be desirable to dispense with the use of resistors to obtain a voltage drop to the motors. This may readily be done by providing a relay the armature of which is operated by two electrically similar coils and leading the current to each motor through one of the coils so that their fields are mutually opposed. Such a relay will trip when a predetermined differential value of current is exceeded.

I claim as my invention:

1. The process of testing an electrical rotating machine comprising simultaneously connecting to substantially identical sources of electrical energy such electrical rotating machine and a similar standard rotating machine and comparing the performance of the two said machines during the period in which they are accelerating against only their own inertia from a standstill.

2. The process of testing an electrical rotating machine against a similar standard machine comprising connecting the first said rotating machine to a source of electrical energy through a resistor of predetermined value, simultaneously connecting said standard machine to a source of electrical energy having the same characteristics as said first named electrical energy source through a resistor having the same characteristics as said first named resistor, and measuring the potential drop through each of said resistors during the period in which the machine to be tested is accelerating to full speed from a standstill against only its own inertia.

3. The process of testing an electrical rotating machine against a similar standard machine comprising providing each machine with a similar external electrical resistance, simultaneously connecting each machine to a suitable source of electrical energy through said resistances, and during the acceleration period from standstill measuring the potential drop across said resistances.

4. The process of testing an electrical rotating machine against a similar standard machine comprising providing each machine with a similar external electrical resistance, simultaneously connecting each machine to a suitable source of electrical energy through said resistances, and during the acceleration period from standstill measuring the potential difference between the two resistances.

5. The process of testing an electrical rotating machine against a similar standard machine comprising providing each machine with a similar external impedance, simultaneously connecting each machine to a suitable source of electrical energy through said impedances, and during the acceleration period from standstill measuring the potential difference between the two impedances.

6. The process of testing an electrical rotating machine against a similar standard machine comprising providing each machine with a similar external electrical resistance, simultaneously connecting each machine to a suitable source of electrical energy having a voltage substantially below the normal voltage for said machines and causing the energy to flow to the machines through said resistances and during the acceleration period measuring the potential difference between the two resistances.

7. The process of testing an electrical rotating machine comprising simultaneously connecting to substantially identical sources of electrical energy such electrical rotating machine and a similar standard rotating machine, the operating current of each machine flowing through the opposed coils of a differential relay which has been adjusted to become actuated by a predetermined difference in currents through the opposed coils, and permitting the machine to be tested and the standard machine to accelerate from standstill whereby any substantial difference between the two machines electrically or mechanically will actuate the relay.

References Cited in the file of this patent

UNITED STATES PATENTS

| 1,117,144 | Latour | Nov. 10, 1914 |
| 1,686,638 | Pierce | Oct. 9, 1928 |
| 2,402,108 | Willard | June 11, 1946 |
| 2,506,106 | Rendel | May 2, 1950 |

FOREIGN PATENTS

| 953,016 | France | Nov. 29, 1949 |